| (12) United States Patent
Tseng | (10) Patent No.: US 7,804,682 B2
(45) Date of Patent: Sep. 28, 2010 |

(54) POSITIONING DEVICE

(75) Inventor: Li-Tien Tseng, Taoyuan County (TW)

(73) Assignee: BenQ Corporation, Taipei (TW)

( * ) Notice: Subject to any disclaimer, the term of this patent is extended or adjusted under 35 U.S.C. 154(b) by 865 days.

(21) Appl. No.: 11/679,185

(22) Filed: Feb. 27, 2007

(65) Prior Publication Data

US 2007/0275629 A1   Nov. 29, 2007

(30) Foreign Application Priority Data

Mar. 29, 2006   (TW) .............................. 95110998 A
May 30, 2006   (TW) .............................. 95119191 A

(51) Int. Cl.
*H05K 7/12* (2006.01)
(52) U.S. Cl. ............................ 361/679.22; 381/679.21; 248/917
(58) Field of Classification Search ............ 361/679.22, 361/679.21; 248/917–924
See application file for complete search history.

(56) References Cited

U.S. PATENT DOCUMENTS

| 5,751,548 A * | 5/1998 | Hall et al. .............. 361/679.41 |
| 7,331,551 B2 * | 2/2008 | Oddsen, Jr. .............. 248/279.1 |
| 2004/0011932 A1 * | 1/2004 | Duff .......................... 248/157 |

FOREIGN PATENT DOCUMENTS

| CN | 2130194 Y | 4/1993 |
| EP | 1 041 335 | 10/2000 |
| TW | 217111 | 12/1993 |

* cited by examiner

*Primary Examiner*—Jayprakash N Gandhi
*Assistant Examiner*—Ingrid Wright

(57) ABSTRACT

A positioning device includes a fixing component including an arc slot with an end. A positioning plate is connected to the fixing component in a rotatable manner relative to the fixing component. The positioning plate includes a pillar positioned within the arc slot. The positioning device further includes a stopper positioned near on the end for stopping the pillar when the pillar slides near the end. A portion of the stopper protrudes over the arc slot to limit a rotational range of the positioning plate relative to the fixing component.

23 Claims, 13 Drawing Sheets

POSITIONING DEVICE

BACKGROUND OF THE INVENTION

1. Field of the Invention

The present invention relates to a positioning device capable of adjusting a rotational range, and more particularly, to a display device capable of adjusting a rotational range of a display monitor.

2. Description of the Prior Art

Liquid crystal displays (LCDs) have been most widely utilized in mobile displays as a replacement for the cathode ray tube (CRT), due to features of excellent picture quality, lightweight, thin size, and low power consumption.

Please refer to FIG. 1. FIG. 1 illustrates a diagram of a conventional display device 10 at different display widths. The display device 10 includes a display monitor 12, and a display base 14 for supporting the display monitor 12. A user can move the display monitor 12 in a rotatable manner relative to the display base 14 to achieve a function of the display monitor 12 at different display widths. However, in the process of producing the display monitor 10, due to a assembling tolerance that causes the display monitors 12 to be unable to have a uniform horizontal or vertical angle, a result will occur wherein the display monitor 12 will have a slanted angle in either the horizontal mode or the vertical mode. In this way, the display monitor 12 can be properly viewed horizontally or vertically, and this greatly affects the quality of the display device 10.

SUMMARY OF THE INVENTION

The claimed invention discloses a positioning device includes a fixing component including an arc slot with an end. A positioning plate is connected to the fixing component in a rotatable manner relative to the fixing component. The positioning plate includes a pillar positioned within the arc slot. The positioning device further includes a stopper positioned near on the end for stopping the pillar when the pillar slides near the end. A portion of the stopper protrudes over the arc slot to limit a rotational range of the positioning plate relative to the fixing component.

The claimed invention further discloses a display device capable of adjusting a rotational range. The display device includes a first fixing component including a first arc slot with a first end, a display monitor, and a positioning plate connected to the fixing component in a rotatable manner relative to the fixing component for supporting the display monitor. The positioning plate includes a first pillar positioned within the first arc slot. The display device further includes a first stopper positioned near the first end for stopping the first pillar when the first pillar slides near the first end. A portion of the first stopper protrudes over the first arc slot to limit a rotational range of the positioning plate relative to the first fixing component.

The claimed invention discloses a positioning device. The positioning device includes a fixing component including an arc slot with an end. A positioning plate connected to the fixing component in a rotatable manner relative to the fixing component. The positioning plate includes a pillar positioned within the arc slot. The positioning device further includes an elastic component positioned near the end of the arc slot and protruding over the arc slot. The elastic component includes a first arm and a second arm. An opening is formed between an end of the first arm and an end of the second arm. A width of the opening is less than a diameter of the pillar. The first arm and the second arm form a space. The first arm and the second arm contain the pillar within the space when the pillar moves to the end of the arc slot.

The claimed invention further discloses a display device. The display device includes a fixing component including an arc slot with an end, a display monitor, and a positioning plate connected to the fixing component in a rotatable manner relative to the fixing component for supporting the display monitor. The positioning plate includes a pillar positioned within the arc slot. The display device further includes an elastic component positioned near the end of the arc slot and protruding over the arc slot. The elastic component includes a first arm and a second arm. An opening is formed between an end of the first arm and an end of the second arm. A width of the opening is less than diameter of the pillar. The first arm and the second arm form a space. The first arm and the second arm contain the pillar within the space when the pillar moves to the end of the arc slot.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
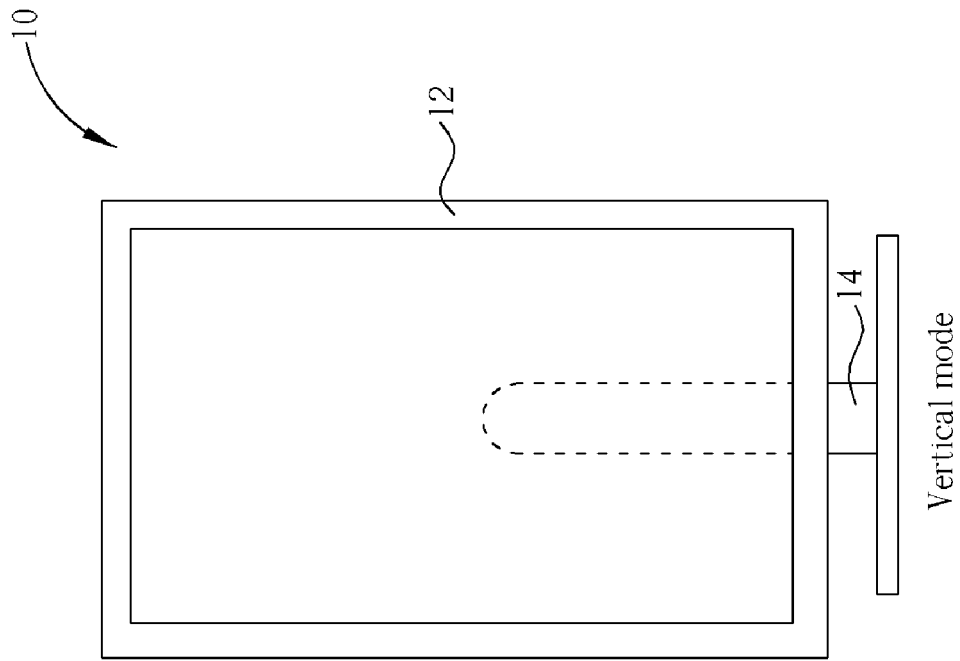
FIG. 1 illustrates a diagram of a conventional display device at different display widths according to the prior art.
Figure 1:
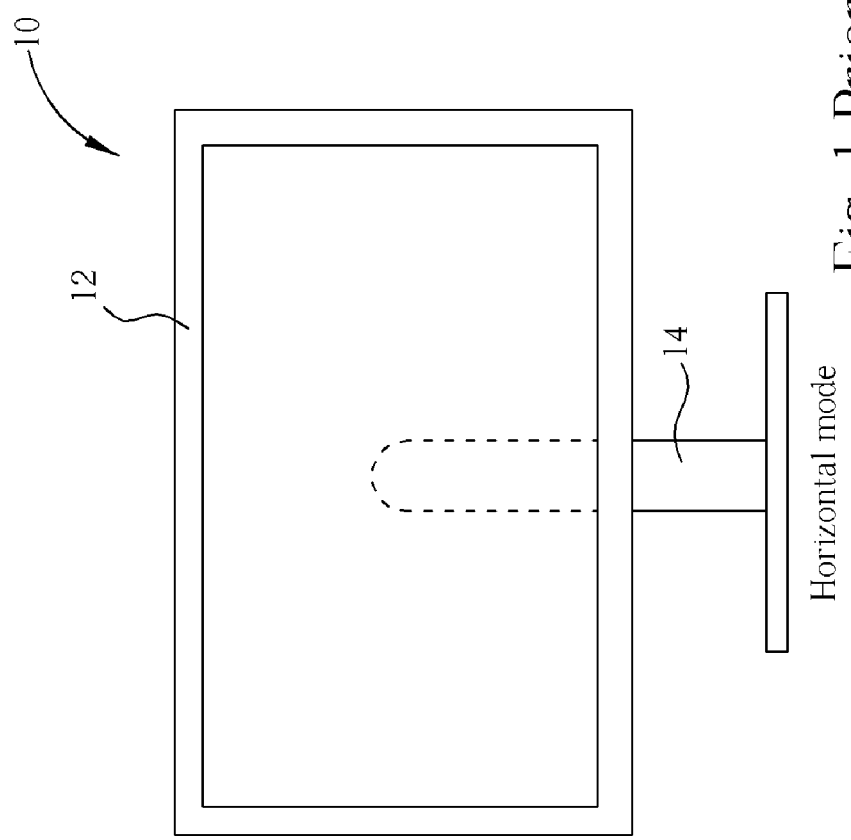
Figure 2:
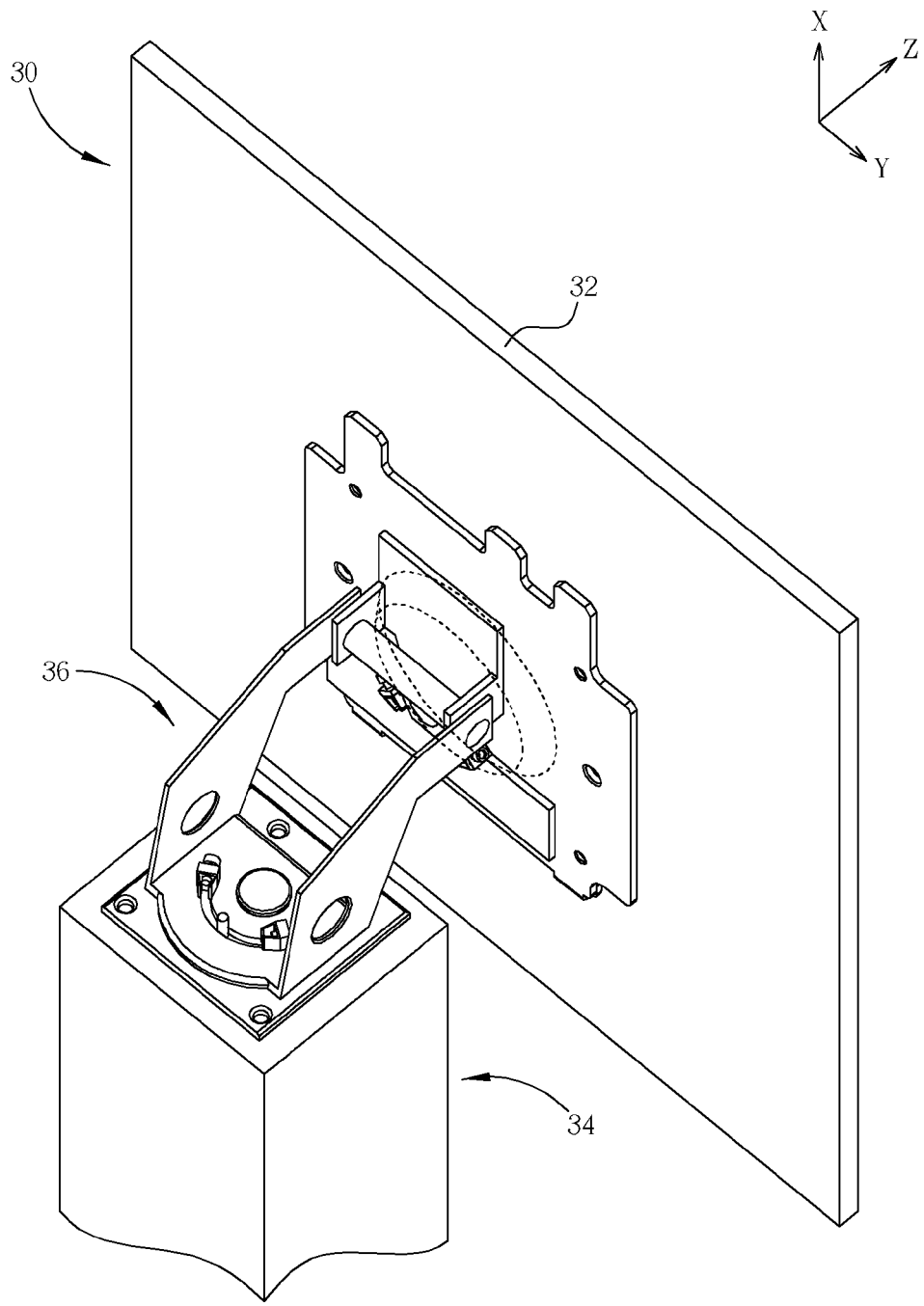
FIG. 2 illustrates an external view diagram of a display device of the present invention.

Please refer to FIG. 2. FIG. 2 illustrates an external view diagram of a display device 30 of the present invention. The display device 30 includes a display monitor 32, a display base 34, and a positioning device 36. An end of the positioning device 36 is connected to the display monitor 32, and another end of the positioning device 36 is connected to the display base 34. A user can adjust the positioning device 36 in such a way that the display monitor 32 can rotate relative to Z axis to achieve an objective of horizontally or vertically viewing of the display monitor 32, or the user can adjust the positioning device 36 in such a way that the display monitor 32 can rotate relative to X axis to adjust different viewing angles of the display monitor 32, or the user can adjust the positioning device 36 in such a way that the display monitor 32 can rotate relative to Y axis to adjust different viewing elevation angles of the display monitor 32. Hence an objective of adjusting the display monitor 32 in three different directions of the three axes (i.e., X, Y, and Z) is achieved.

Figure 3:
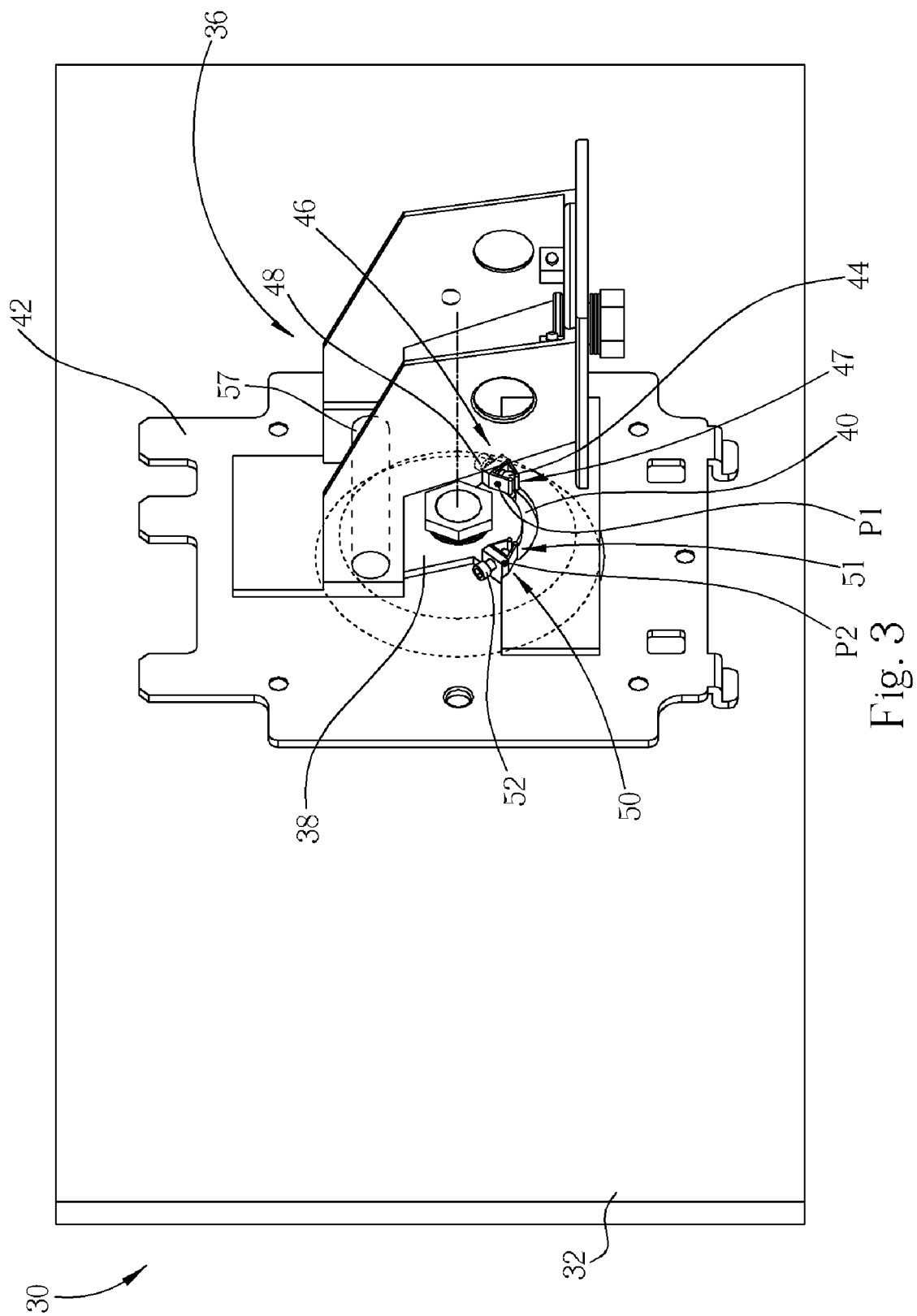
FIG. 3 illustrates a diagram of a positioning device of the present invention.
Figure 4:
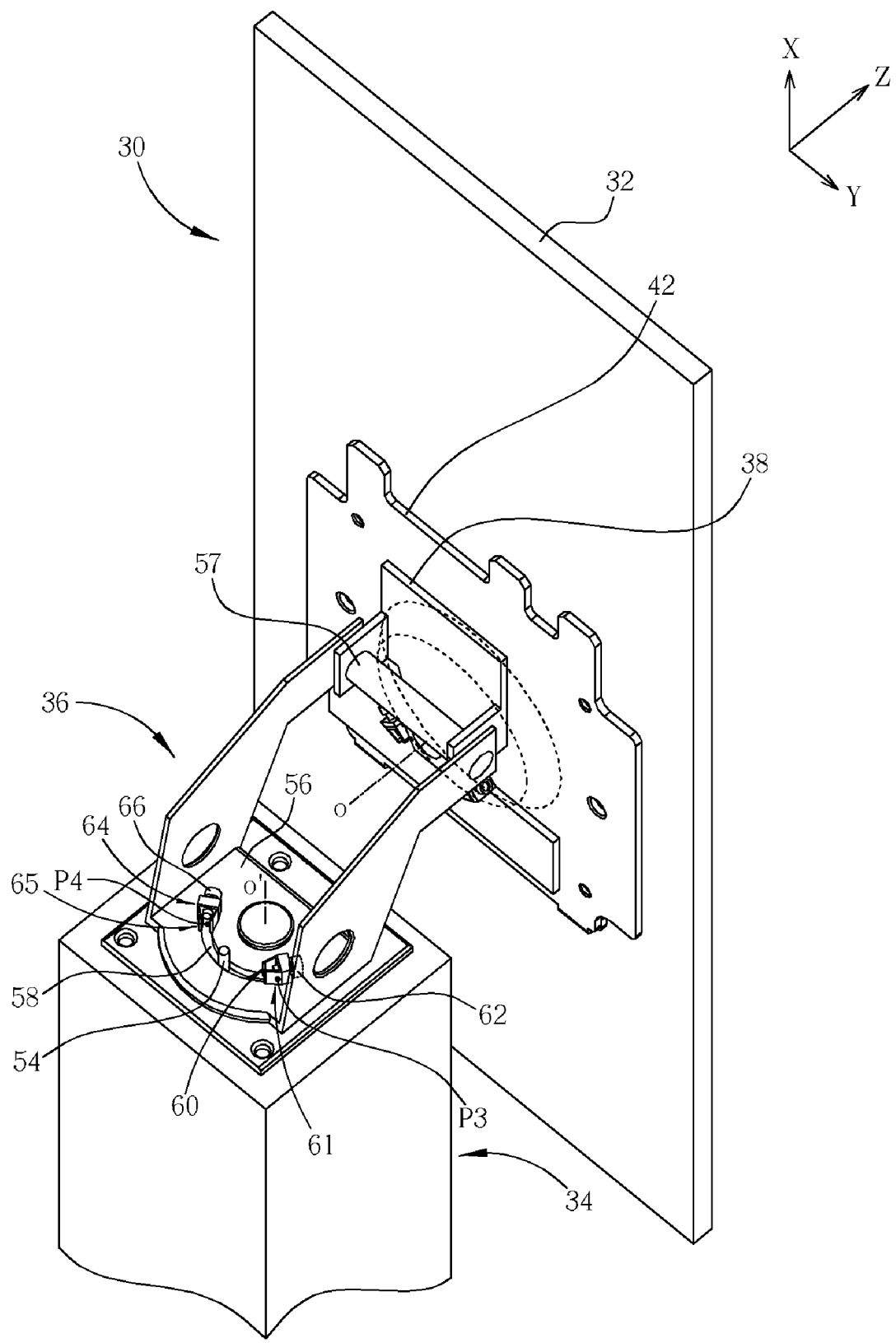
FIG. 4 illustrates a diagram of a positioning device of the present invention.

Please refer to FIG. 3 and FIG. 4. FIG. 3 and FIG. 4 illustrate diagrams of a positioning device 36 of the present invention. The positioning device 36 includes a first fixing component 38 with a first arc slot 40. The first arc slot 40 includes a first end P1 and a second end P2, where the first end is positioned at an end of the arc slot 40, and the second end P2 is positioned at another end of the arc slot 40. The positioning device 36 further includes a positioning plate 42 connected to the first fixing component 38 in a rotatable manner relative to an axle center O of the first fixing component, for example the positioning plate 42 can be pivoted to the first fixing component 38 at the axle center O so that the display monitor 32 can rotate relative to the Z axis. The positioning plate is utilized for supporting the display monitor 32. The positioning plate includes a first pillar 44 positioned within the first arc slot 40 in a movable manner. The positioning device 36 further includes a first stopper 46 positioned near the first end P1. When the first pillar 44 within the arc slot 40 slides near the first end P1, the first stopper 46 is utilized for stopping the first pillar 44, a portion of the first stopper 46 protrudes over the first arc slot 40 to limit a rotating range of the positioning plate 42 relative to the first fixing component 38. The first stopper 46 includes a screw 48 positioned on the fixing component in a movable manner. A length of the screw 48 protruding over the first arc slot 40 can be adjusted to change the range limit of the positioning plate 42 relative to the fixing component 38. The positioning device 36 further includes a second stopper 50 positioned near the second end P2 of the first arc slot 40. A portion of the second stopper 50 protrudes over the first arc slot 40. When the first pillar 44, within the first arc slot 40, slides near the second end P2, the second stopper 50 is utilized for stopping the first pillar 44 to limit a rotating range of the positioning plate 42 relative to the first fixing component 38. The second stopper 50 includes a screw 52 positioned on the first fixing component 38 in a movable manner. A length of the screw 52, protruding over the first arc slot 40, can be adjusted to change the range limit of the positioning plate 42 relative to the first fixing component 38. The positioning device 36 further includes a first elastic component 47 positioned near the first end P1 and protrudes over the first arc slot 40, and a second elastic component 51 positioned near the second end P2 and protrudes over the first arc slot 40.

Furthermore, a second pillar 54 is positioned on the display base 34, the positioning device 36 further includes a second fixing component 56 connected to the display base 34 in a rotatable manner relative to an axle center O' of the display base. For example, the second fixing component 56 can be pivoted to the display base 34 at the axle center O' so that the display monitor 32 can rotate relative to the X axis. Furthermore, the display device 30 further includes a rotating shaft 57 connected to the first fixing component 38 and the second fixing component 56 for rotating the first fixing component 38 relative to the second component 56 such that the display monitor 32 rotates relative to the Y axis so that the display device 32 can be adjusted to different viewing elevation angles. A second arc slot 58 is positioned on the second fixing component 56 for containing the second pillar 54. The second arc slot 58 includes a third end P3 and a fourth end P4, where the third end P3 is positioned at an end of the second arc slot 58, and the fourth end P4 is positioned at another end of the second arc slot 58. The positioning device 36 further includes a third stopper 60 positioned near the third end P3 for stopping the second pillar 54 when the second pillar 54 within the second arc slot 58 slides near the third end P3. A portion of the third stopper 60 protrudes over the second arc slot 58 so as to limit a rotating range of the second fixing component 56 relative to the display base 34. The third stopper 60 includes a screw 62, positioned on the second fixing component 56, in a movable manner. A length of the screw 62 protruding over the second arc slot 58 can be adjustable to change the range limit of the second fixing component relative to the display base 34. The positioning device 36 further includes a fourth stopper 64 positioned near the fourth end P4 for stopping the second pillar 54 when the second pillar 54 within the second arc slot 58 slides near the fourth end P4. A portion of the fourth stopper 64 protrudes over the second arc slot 58 so as to limit a rotating range of the second fixing component 56 relative to the display base 34. The fourth stopper 64 includes a screw 66 positioned on the second fixing component 56 in a movable manner. A length of the screw 66 protruding over the second arc slot 58 can be adjustable to change the range limit of the second fixing component 56 relative the display base 34. The positioning device further includes a third elastic component 61 positioned near the third end P3 and protrudes over the second arc slot 58, and a fourth elastic component 65 positioned near the fourth end P4 and protrudes over the second arc slot 58.

Figure 5:
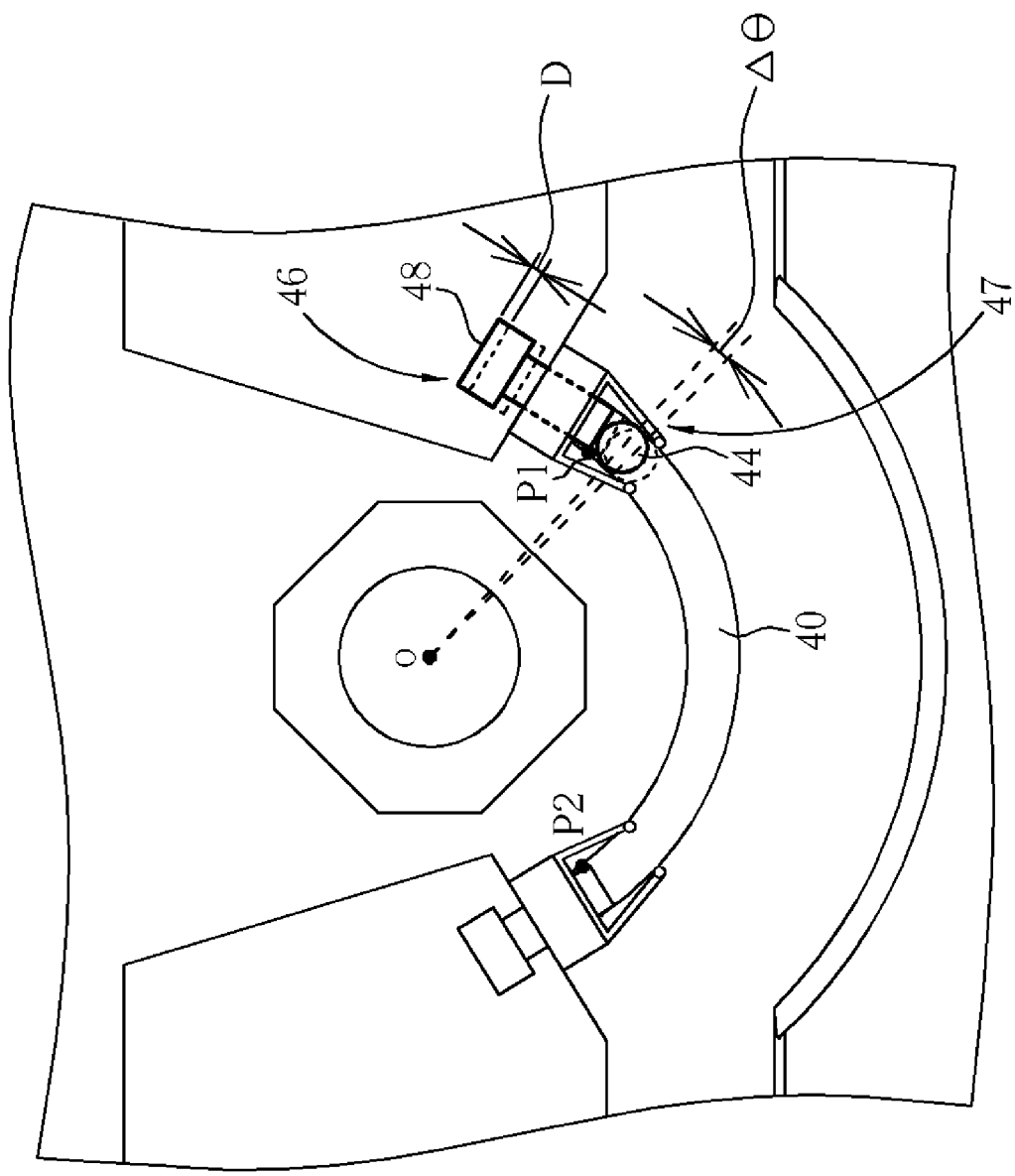
FIG. 5 illustrates a diagram of adjusting a first stopper to limit a rotating range of a positioning plate relative to a first fixing component according to the present invention.
Figure 6:
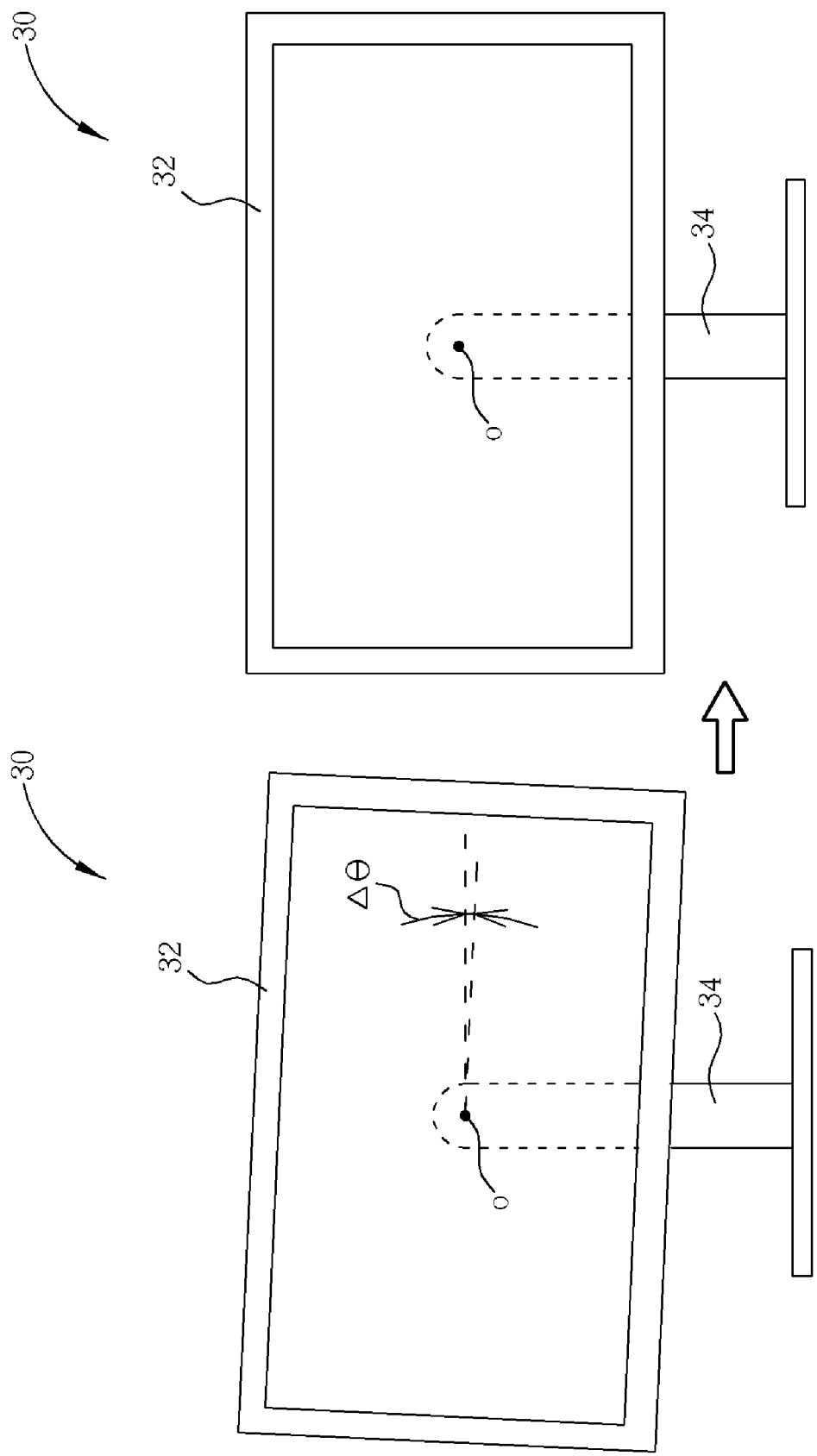
FIG. 6 illustrates a diagram of adjusting a display monitor after the first stopper is being adjusted in FIG. 5.

Please refer to FIG. 5 and FIG. 6. FIG. 5 illustrates a diagram of adjusting a first stopper 46 to limit a rotating range of a positioning plate 42 relative to a first fixing component 38. FIG. 6 illustrates a diagram of adjusting a display monitor 32 after the first stopper 46 is being adjusted in FIG. 5. When the positioning plate 42 rotates relative to the first fixing component 38 in such a way the first pillar 44 within the first arc slot 40 slides near the first end P1, the screw 48 of the first stopper 46 stops the first pillar 44 to limit the rotating range of the positioning plate 42 relative to the first fixing component 38. Thus, the screw 48 of the first stopper 46 can be rotated to change its degree of protrusion within a length of the first arc slot 40. As illustrated in FIG. 5, when the screw 48 is being screwed a distance D into the first arc slot 40, there will be a change in the first pillar 44 near an end sliding point of the first end P1 of the first arc slot 40, hence the rotational range limit of the first pillar 44 relative to the axle center O will be adjusted by an angle $\Delta\Theta$ in a clockwise direction. As illustrated in FIG. 6, if the positioning plate 42 rotates relative to the first fixing component 38 in such a way that the display monitor 32 is at a horizontal mode, then at this time the first pillar 44 within the first arc slot 40 slides near the first end P1, and when the screw 48 stops the first pillar 44, from the direction where the user views the display monitor 32 (from the front view of the display monitor 32), the display monitor 32 is slanted by $\Delta\Theta$ degrees in the clockwise direction, and the status of a complete horizontal status is not achieved. The screw 48 of FIG. 5 is being screwed the distance D into the first arc slot 40 in such a way that the rotational range limit of the first pillar 44 relative to the axle center O will be adjusted by the angle $\Delta\Theta$ in an anti-clockwise direction, at this time, from where the direction the user views the display module 32 (from the front view of the display module 32 or in other words, from the user's perspective), the display monitor 32 can be rotated in the counter-clockwise direction by $\Delta\Theta$ degree to achieve the complete horizontal status, in another words, the adjustment of a horizontal angle of the display monitor 32 is completed. Relatively, from the direction where the user is viewing the display monitor 32 (from the front view of the display monitor 32), the display monitor 32 is slanted by ΔΘ degrees in the counter-clockwise direction, the screw 48 can be screwed over the first arc slot 40 so that the rotational range limit of the first pillar 44 relative to the axle center O is adjusted in the anti-clockwise direction (from the rear view of the display monitor 32), hence the following process will not reiterated.

Figure 7:
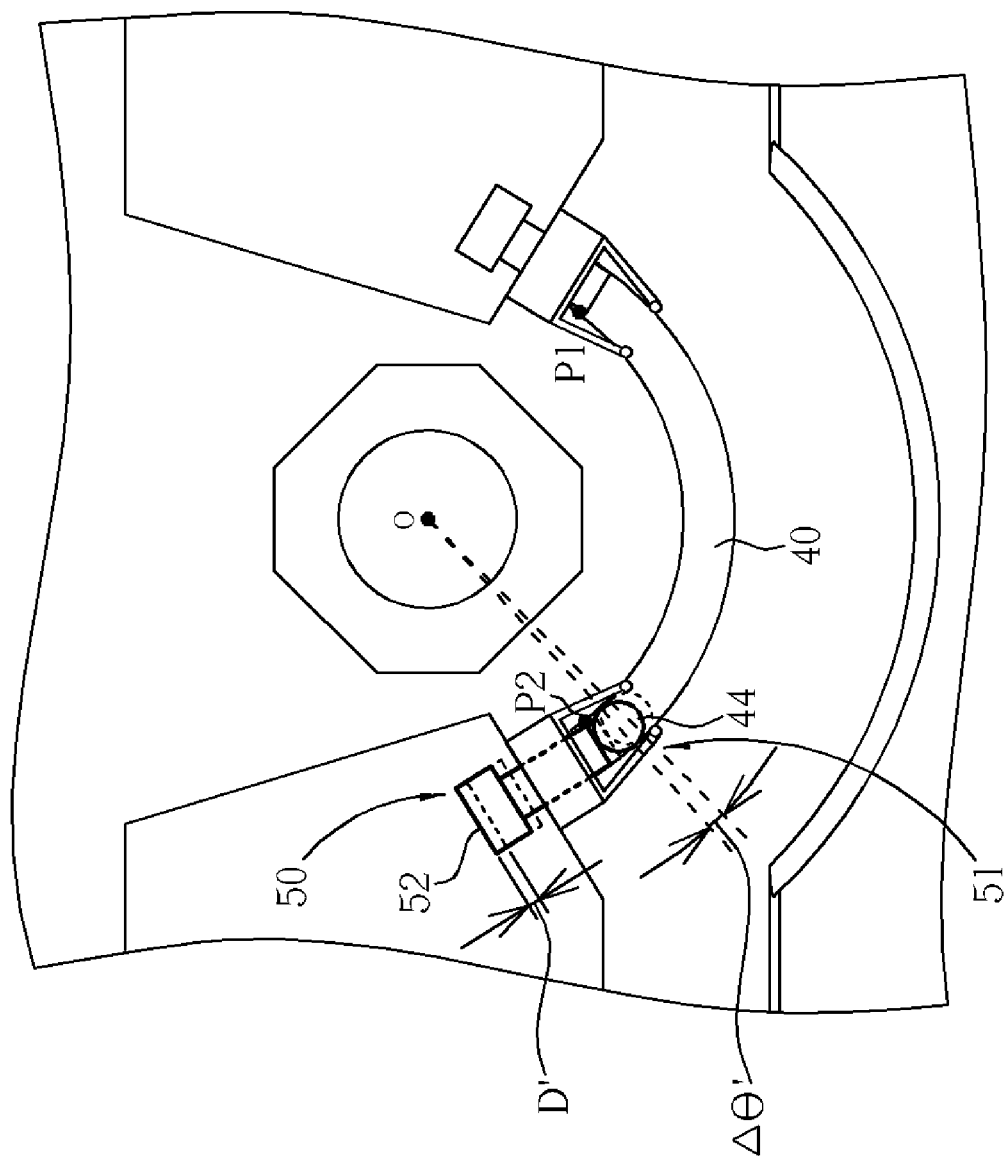
FIG. 7 illustrates a diagram of adjusting a second stopper to limit a rotating range of a positioning plate relative to a first fixing component according to the present invention.
Figure 8:
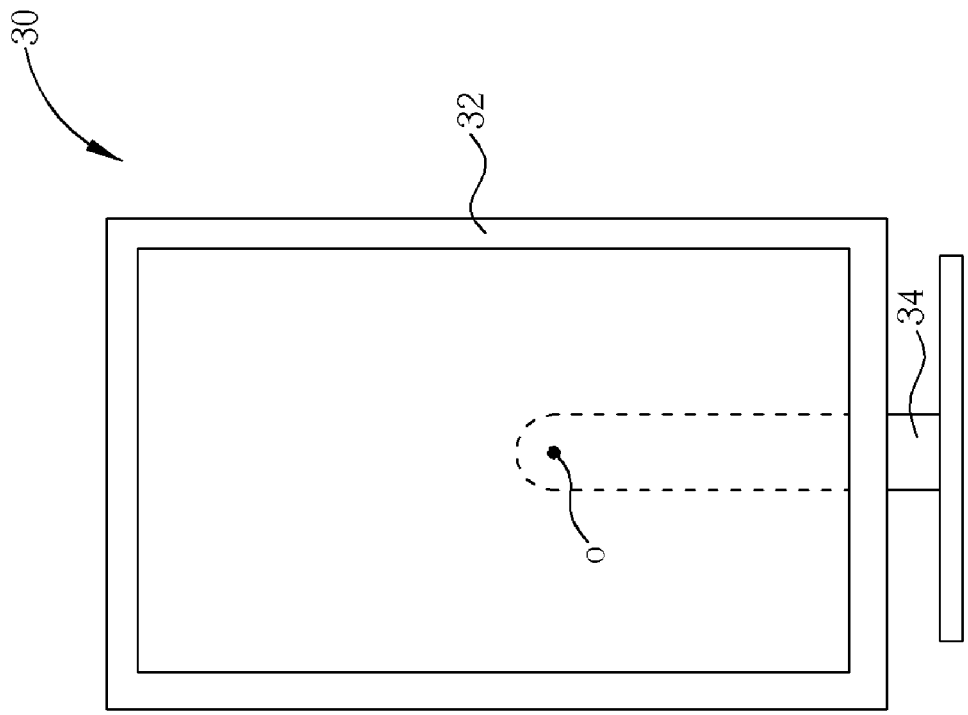
FIG. 8 illustrates a diagram of adjusting a display monitor after the second stopper is being adjusted in FIG. 5.
Figure 8:
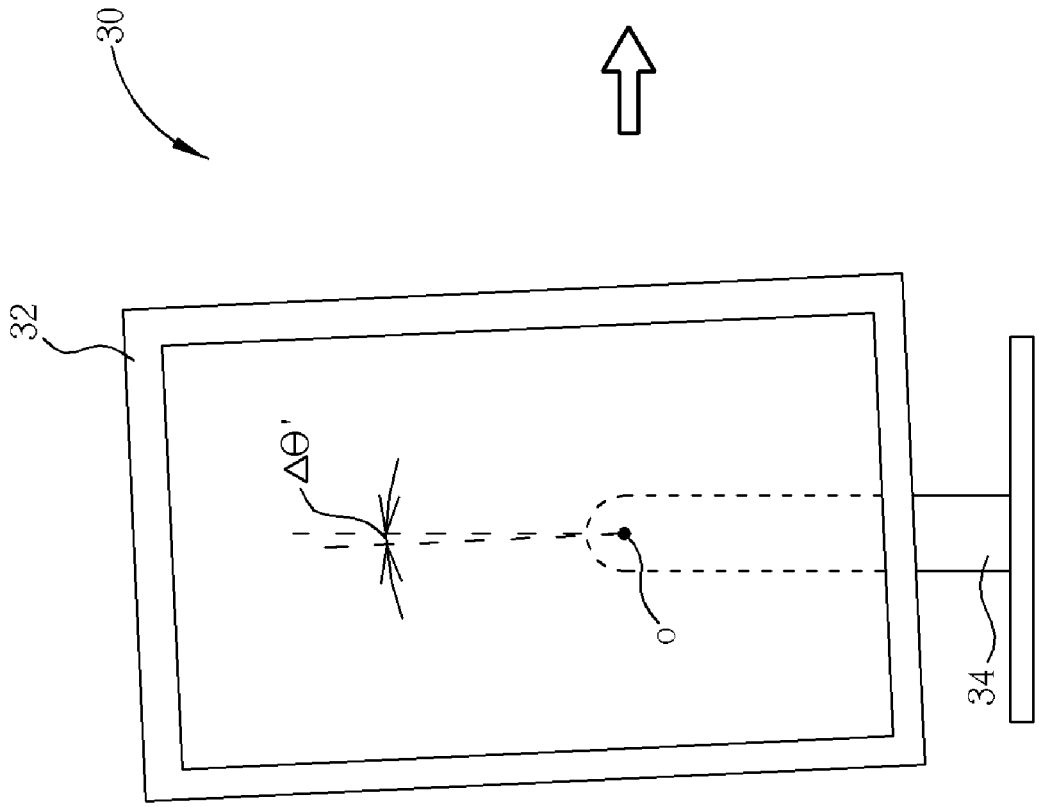

Please refer to FIG. 7 and FIG. 8. FIG. 7 illustrates a diagram of adjusting a second stopper 50 to limit a rotating range of a positioning plate 42 relative to a first fixing component 38. FIG. 8 illustrates a diagram of adjusting a display monitor 32 after the second stopper 50 is being adjusted in FIG. 5. When the positioning plate 42 rotates relative to the first fixing component 38 in such a way that the first pillar 44 within the first arc slot 40 slides near the second end P2, the screw 52 of the second stopper 50 stops the first pillar 44 to limit the rotational range of the positioning plate 42 relative to the first fixing component 38. Thus the screw 52 of the second stopper 50 can be rotated to change its protrusion within a length of the first arc slot 40. As illustrated in FIG. 7, when the screw 52 is being screwed a distance D' into the first arc slot 40, there will be a change in the first pillar 44 near an end sliding point of the second end P2 of the first arc slot 40, hence the rotational range limit of the first pillar 44 relative to the axle center O will be adjusted by an angle ΔΘ' in the counter-clockwise direction. As illustrated in FIG. 8, if the positioning plate 42 rotates relative to the first fixing component 38 in such a way that the display monitor 32 is at a vertical mode, and at this time the first pillar 44 within the first arc slot 40 slides near the second end P2, and when the screw 52 stops the first pillar 44, from the direction where the user views the display monitor 32 (from the front view of the display monitor 32), the display monitor 32 is slanted by ΔΘ' degrees in the counter-clockwise direction, and the status of a complete vertical status is not achieved. The screw 52 of FIG. 7 is being screwed the distance D' into the first arc slot 40 in such a way that the rotational range limit of the first pillar 44 relative to the axle center O will be adjusted by the angle ΔΘ' degrees in the counter-clockwise direction (from the rear view of the display monitor 32), at this time, from where the direction the user views the display module 32 (from the front view of the display module 32), the display monitor 32 can be rotated in the clockwise direction by ΔΘ' degrees to achieve the complete vertical status, in another words, the adjustment of a vertical angle of the display monitor 32 is completed. Relatively, from the direction where the user is viewing the display monitor 32 (from the front view of the display monitor 32), the display monitor 32 is slanted by ΔΘ' degrees in the clockwise direction, the screw 52 can be screwed over the first arc slot 40 so that the rotational range limit of the first pillar 44 relative to the axle center O is adjusted in the clockwise direction (from the rear view of the display monitor 32), hence the following process will not reiterated.

Similarly, if the rotational range of the display monitor 32 relative to the X axis is to be adjusted, the protruding lengths of the screw 62 of the third stopper 60 and the screw 66 of the fourth stopper 64 over the second arc slot 58 can be adjusted to limit the sliding range of the second pillar 54 within the second arc slot 58 in order to adjust the rotational range limit of the second pillar 54 relative to the axle center O', hence the rotational range limit of the second fixing component 56 relative to the display base 34 is also being changed, the mentioned theory is similar to the above-mentioned theory of adjusting the first stopper 46 and the second stopper 50, therefore it will not be reiterated.

Figure 9:
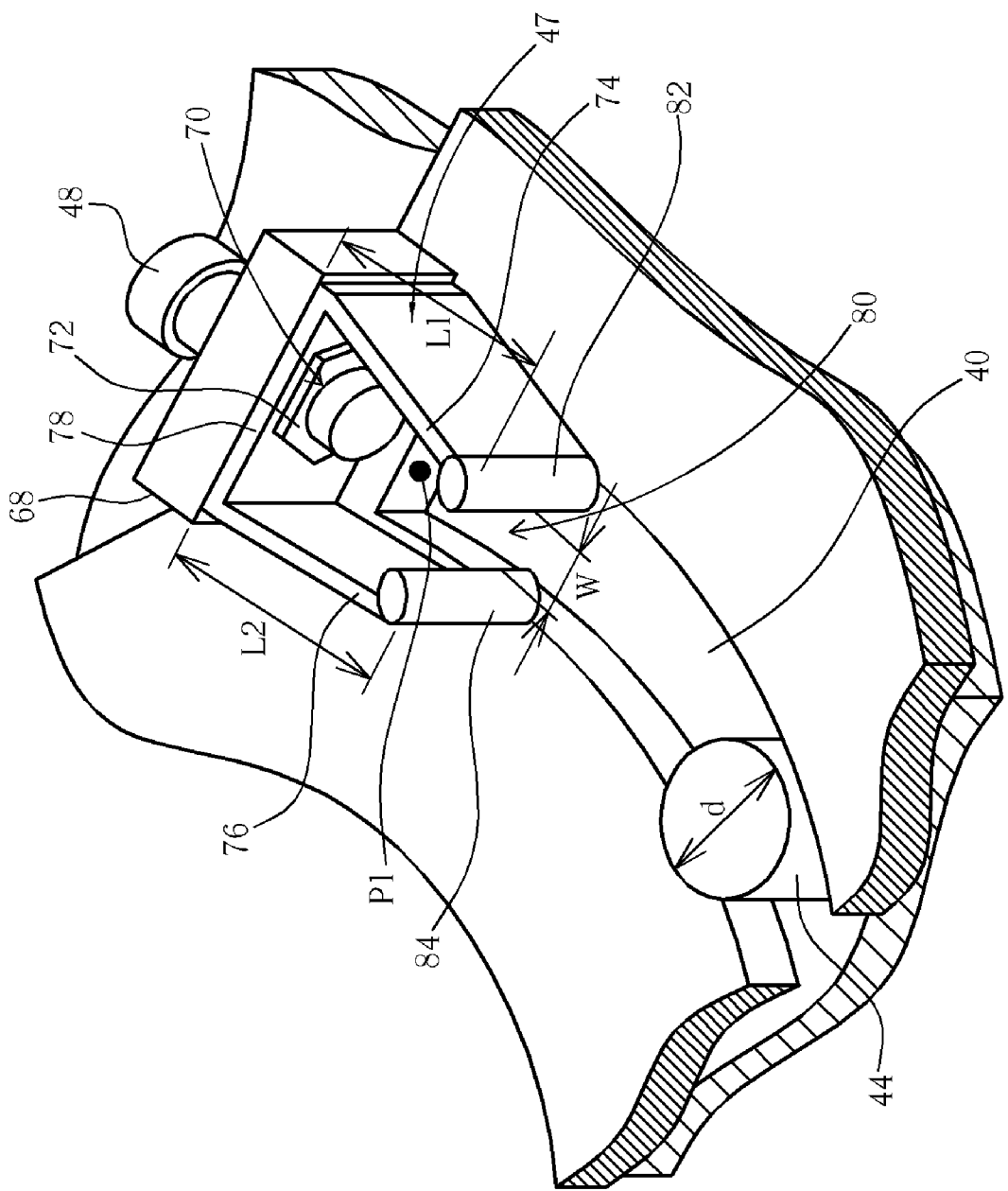
FIG. 9 is a sectional enlarged diagram of a first elastic component according to the present invention.
Figure 10:
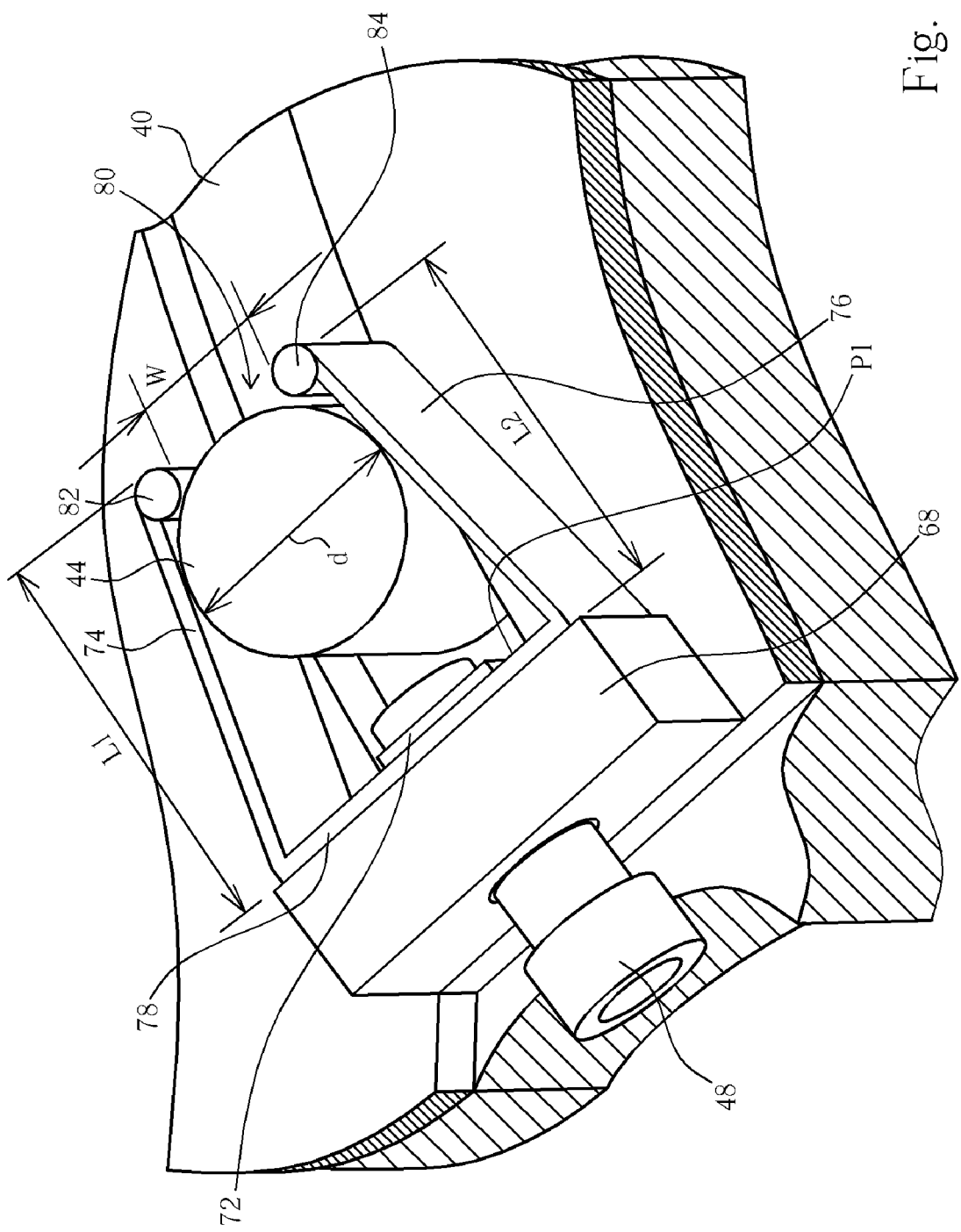
FIG. 10 illustrates a sectional enlarged diagram of a pillar contained in a first elastic component according to the present invention.

Please refer to FIG. 9 and FIG. 10. FIG. 9 is a sectional enlarged diagram of a first elastic component 47 according to the present invention. FIG. 10 illustrates a sectional enlarged diagram of a pillar 44 contained in a first elastic component 47 according to the present invention. The first stopper 46 includes a damper with a screw opening 70. The screw 48 is positioned within the screw opening 70 of the damper in a movable manner. The length of the screw 48 protruding over the first arc slot 40 can be adjusted to change the range limit of the positioning plate 42 relative to the first fixing component 38. The first stopper 46 further includes a screw cap fixed on the screw 48 for clamping the elastic component 47 with the damper 68. Additionally, the clamping of the first elastic component and the damper 68 with the screw 48 can reduce additional cost of clamping the first elastic component 47. The first elastic component 47 includes a first arm 74, a second arm 76, and a connecting portion 78 connected to the first stopper 46 and positioned near the end of the first arc slot 40, two ends of the connecting portion 78 are respectively connected to the first arm 74 and the second arm 76, where a length L1 of the first arm 74 and a length L2 of the second arm 76 are greater than a diameter d of the first pillar 44. In this conditions, the first pillar 44 is able to enter a space formed by the first arm 74, the second arm 76 and the connecting portion 78 and a slight adjustment to the range of the screw 48 can be satisfied. A first opening 80 is formed between the first arm 68 and the second arm 70, A width W of the first opening 80 is less than the diameter of the first pillar 44. When the first pillar 44 passes through the first opening 80, the first arm 74 and the second arm 76 generate an elastic change to exert a resistance on the first pillar 44 such that when the first pillar 44 reaches a top end of the screw 48 and an additional force is required for the first pillar 44 to contact the screw 48. The first elastic component 47 further includes a first roller 82 connected to an end of the first arm 74 for contacting the first pillar 44 when the first pillar 44 passes through the first opening 80, and a second roller 84 connected to an end of the second arm 76 for contacting the first pillar 44 when the first pillar 44 passes through the first opening 80. The function of the first roller 82 and the second roller 84 is to reduce frictional damage caused between the first elastic component 47 and the first pillar 44, Hence a lifespan of the first elastic component 47 can be increased.

When the first pillar 44 within the first arc slot 40 slides towards the first stopper 46, as the width W of the first opening 80 is less than the diameter d of the first pillar 44. When the first pillar 44 passes through the first opening 80, the first pillar 44 will shove the first arm 74 and the second arm 76. The first arm 74 and the second arm 76 will generate an elastic change, thus the first arm 74 and the second arm 76 will exert a resistance on the first pillar 44 so that the user is required to exert additional force on the first pillar 44 to contact the top end of the screw 48 to prevent the first pillar 44 from a direct impact onto the screw 48 which can cause frictional damage on the screw 48. Furthermore, the degree of the resistance is provided by the first elastic component 47 can be adjusted by changing the length of the first arm 74 and the length of the second arm 76 or the size of the first opening 80. After the first pillar 44 passes through the first opening 80 and slides near the first end P1, the first pillar 44 is being contained within the first elastic component 47, in other words, the space formed the first arm 74, the second arm 76, and the connecting portion 78 is utilized for containing the first pillar 44. The first pillar 44 stops the screw 48 and the first elastic component 47 and the first pillar 44 is fixed within the first end P1. However the range of the screw 48 can be adjusted slightly due to the elastic component 47. Similarly, the architecture of the second elastic component 51, the third elastic component 61, and the fourth elastic component 65 is similar to the architecture of the first elastic component 47, therefore the related details will not be reiterated for the sake of brevity.

Figure 11:
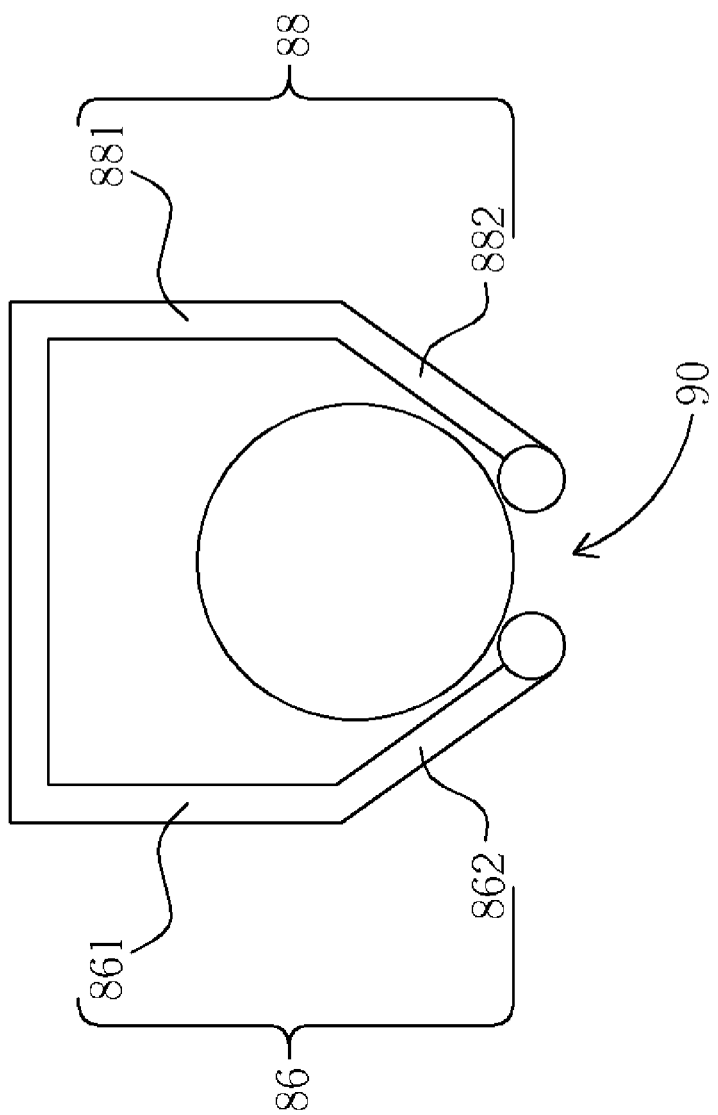
FIG. 11 illustrates a diagram of an elastic component according to an embodiment of the present invention.
Figure 12:
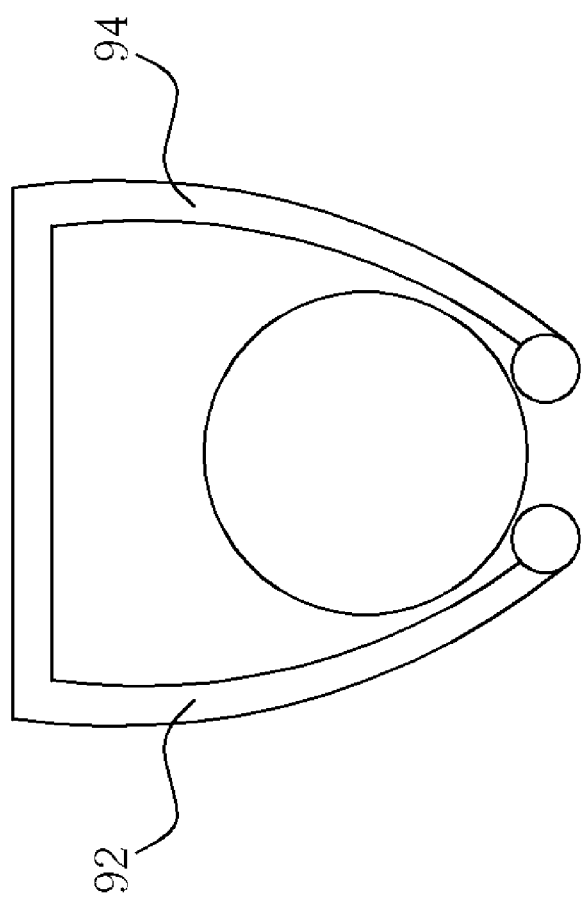
FIG. 12 illustrates a diagram of an elastic component according to an embodiment of the present invention.
Figure 13:
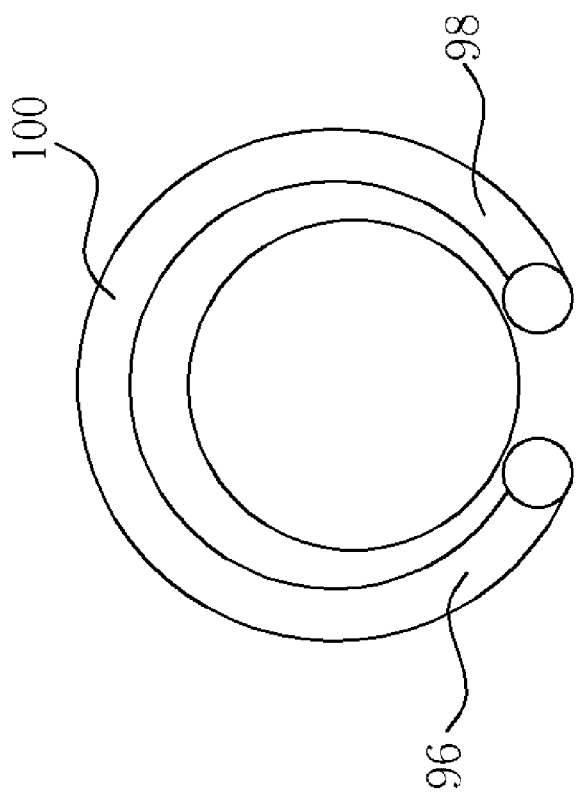
FIG. 13 illustrates a diagram of an elastic component according to an embodiment of the present invention.

Please refer to FIG. 11 and at the same time to FIG. 12 and FIG. 13. FIG. 11 to FIG. 13 illustrates a diagram of an elastic component according to other embodiments of the present invention. As illustrated in FIG. 11, a first arm 86 of the elastic component includes a first section 861 and a second section 862, and an included angle of the first section 861 and the second section 862 is an obtuse angle. A second arm 88 of the elastic component includes a third section 881 and a fourth section 882, and an included angle of the third section and the fourth section is an obtuse angle. An opening 90 is formed by the second section 862 and the fourth section 882, where the length of the first section 861 and the length of the third section 881 are respectively greater than a diameter of the pillar such that the pillar can be contained within the first arm 86 and the second 88. Furthermore, as illustrated in FIG. 12, a shape of a first arm 92 and a second arm 94 of the elastic component is an arc-shape, the round shape of the pillar can be contained within the first arm 92 and the second arm 94. As illustrated in FIG. 13, the shape of a first arm 96, the second arm 98, and the connecting portion 100 forms an arc shape, and the round shape of the pillar can be contained within the first arm 96 and the second arm 98, and the connecting portion 100. The present invention can be applied on different elastic component, in other words, the objectives of the elastic component for providing the pillar resistance and containing and fixing the pillar all fall under the bounds and limits of the present invention.

In comparison to the conventional display device, the display device of the present invention utilizes a blocking mechanism to achieve the objective of adjusting the rotational range of the display monitor. Thus, the present invention can overcome the assembling tolerance during the process of production that causes the display monitors unable to have a uniform horizontal or vertical angle, which presents a problem of cost due to the increasing demand on the precision molding; furthermore, the elastic component of the blocking mechanism can achieve objectives of the elastic component providing the pillar resistance and containing and fixing the pillar, and also the lifespan of the blocking mechanism can be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A positioning device capable of adjusting a rotational range, the positioning device comprising:
   a fixing component comprising an arc slot with an end;
   a positioning plate connected to the fixing component in a rotatable manner relative to the fixing component, the positioning plate comprising a pillar positioned within the arc slot; and
   a stopper positioned near on the end for stopping the pillar when the pillar slides near the end, a portion of the stopper protruding over the arc slot to limit a rotational range of the positioning plate relative to the fixing component, the stopper comprises a screw positioned on the fixing component in a movable manner, length of the screw protruding over the arc slot is adjustable so as to change the range limit of the positioning plate relative to the fixing component;
   wherein when the length of the screw protruding over the arc slot is increased, then the range of the positioning plate rotatable relative to the fixing component is reduced;
   wherein when the length of the screw protruding over the arc slot is reduced, then the range of the positioning plate rotatable relative to the fixing component is increased.

2. The positioning device of claim 1 wherein the positioning plate is pivoted to the fixing component.

3. The positioning device of claim 1 wherein the positioning plate is utilized for supporting a display monitor.

4. A display device capable of adjusting a rotational range, the display device comprising:
   a first fixing component comprising a first arc slot with a first end;
   a display monitor;
   a positioning plate connected to the first fixing component in a rotatable manner relative to the first fixing component for supporting the display monitor, the positioning plate comprising a first pillar positioned within the first arc slot; and
   a first stopper positioned near the first end for stopping the first pillar when the first pillar slides near the first end, a portion of the first stopper protruding over the first arc slot to limit a rotational range of the positioning plate relative to the first fixing component, the first stopper comprises a screw positioned on the first fixing component in a movable manner, length of the screw protruding over the first arc slot is adjustable so as to change the range limit of the positioning plate relative to the first fixing component;
   wherein when the length of the screw protruding over the first arc slot is increased, then the range of the positioning plate rotatable relative to the first fixing component is reduced;
   wherein when the length of the screw protruding over the first arc slot is reduced, then the range of the positioning plate rotatable relative to the first fixing component is increased.

5. The display device of claim 4 further comprising:
   a display base comprising a second pillar;
   a second fixing component connected to the display base in a rotatable manner relative to the display base, the second fixing component comprising a second arc slot for containing the second pillar, the second arc slot comprising a second end; and
   a second stopper positioned near on the second end for stopping the second pillar when the second pillar slides near the second end, a portion of the second stopper protruding over the second arc slot so as to limit a rotational range of the second fixing component relative to the display base.

6. The display device of claim 4 wherein the positioning plate is pivoted to the first fixing component.

7. A positioning device with a rotary component, the positioning device comprising:
   a fixing component comprising an arc slot with an end;
   a positioning plate connected to the fixing component in a rotatable manner relative to the fixing component comprising a pillar positioned within the arc slot; and
   an elastic component positioned near the end of the arc slot and protruding over the arc slot, the elastic component comprising a first arm and a second arm, wherein an opening is formed between an end of the first arm and an end of the second arm, a width of the opening is less than a diameter of the pillar, the first arm and the second arm form a space;

wherein the first arm and the second arm contain the pillar within the space when the pillar moves to the end of the arc slot.

8. The positioning device of claim 7 further comprising a stopper positioned near the end of the arc slot for stopping the pillar when the pillar within the arc slot slides near the end of the arc slot, a portion of the stopper protruding over the arc slot so as to limit a rotational range of the positioning plate relative to the fixing component.

9. The positioning device of claim 8 wherein when the pillar passes through the opening, the elastic component generates an elastic change and exerts a resistance on the pillar, when the pillar slides near the end of the arc slot, the pillar stops the stopper and the elastic component.

10. The positioning device of claim 8 wherein the stopper comprises:
   a damper with a screw opening;
   a screw positioned within the screw opening of the damper in a movable manner, a length of the screw protruding over the arc slot being adjustable so as to change the range limit of the positioning plate relative to the fixing component; and
   a screw cap fixed on the screw for clamping the elastic component with the damper.

11. The positioning device of claim 7 wherein length of the first arm and length of the second arm are greater than the diameter of the pillar.

12. The positioning device of claim 7 wherein the elastic component further comprises a connecting portion positioned near the end of the arc slot, two ends of the connecting portion are respectively connected to the first arm and the second arm, and the space is formed by the first arm, the second arm, and the space for containing the pillar.

13. The positioning device of claim 12 wherein the first arm comprises a first section and a second section, and an included angle of the first section and the second section is an obtuse angle, the second arm comprises a third section and a fourth section, and an included angle of the third section and the fourth section is an obtuse angle, the opening is formed by the second section and the fourth section.

14. The positioning device of claim 13 wherein length of the connecting portion, length of the first section, and length of the third section are greater than the diameter of the pillar.

15. The positioning device of claim 7 wherein shape of the first arm and the second arm is an arc-shape.

16. The positioning device of claim 7 wherein the elastic component further comprises:
   a first roller connected to an end of the first arm for contacting the pillar when the pillar passes through the opening; and
   a second roller connected to an end of the second arm for contacting the pillar when the pillar passes through the opening.

17. A display device with a rotary component, the display device comprising:
   a fixing component comprising an arc slot with an end;
   a display monitor;
   a positioning plate connected to the fixing component in a rotatable manner relative to the fixing component for supporting the display monitor, the positioning plate comprising a pillar positioned within the arc slot; and
   an elastic component positioned near the end of the arc slot and protruding over the arc slot, the elastic component comprising a first arm and a second arm, wherein a opening is formed between an end of the first arm and an end of the second arm, width of the opening is less than diameter of the pillar, the first arm and the second arm form a space;
   wherein the first arm and the second arm contain the pillar within the space when the pillar moves to the end of the arc slot.

18. The display device of claim 17 further comprising a stopper positioned near the end of the arc slot for stopping the pillar when the pillar within the arc slot slides near the end of the arc slot, a portion of the stopper protruding over the arc slot so as to limit a rotational range of the positioning plate relative to the fixing component.

19. The display device of the claim 18 wherein when the pillar passes through the opening, the elastic component generates an elastic change and exerts a resistance on the pillar, when the pillar within the opening slides near the end of the arc slot, the pillar stops the stopper and the elastic component.

20. The display device of claim 18 wherein the stopper comprises:
   a damper with a screw opening;
   a screw positioned within the screw opening of the damper in a movable manner, a length of the screw protruding over the arc slot being adjustable so as to change the range limit of the positioning plate relative to the fixing component; and
   a screw cap fixed on the screw for clamping the elastic component with the damper.

21. The display device of the claim 17 wherein the elastic component further comprises a connecting portion, two ends of the connecting portion are respectively connected to the first arm and the second arm, and a space is formed by the first arm, the second arm, and the connecting portion for containing the pillar, when the pillar passes through the opening, the elastic component generates an elastic change and exerts a resistance on the pillar, when the pillar within the opening slides near the end of the arc slot, the pillar stops the stopper and the elastic component.

22. The display device of claim 21 wherein the first arm comprises a first section and a second section, and an included angle of the first section and the second section is an obtuse angle, the second arm comprises a third section and a fourth section, and an included angle of the third section and the fourth section is an obtuse angle, the opening is formed by the second section and the fourth section.

23. The display device of claim 17 wherein the elastic component further comprises:
   a first roller connected to an end of the first arm for contacting the pillar when the pillar passes through the opening; and
   a second roller connected to an end of the second arm for contacting the pillar when the pillar passes through the opening.

* * * * *